Dec. 2, 1930. E. S. HOYT 1,783,790
POULTRY FEEDER
Filed Dec. 6, 1928
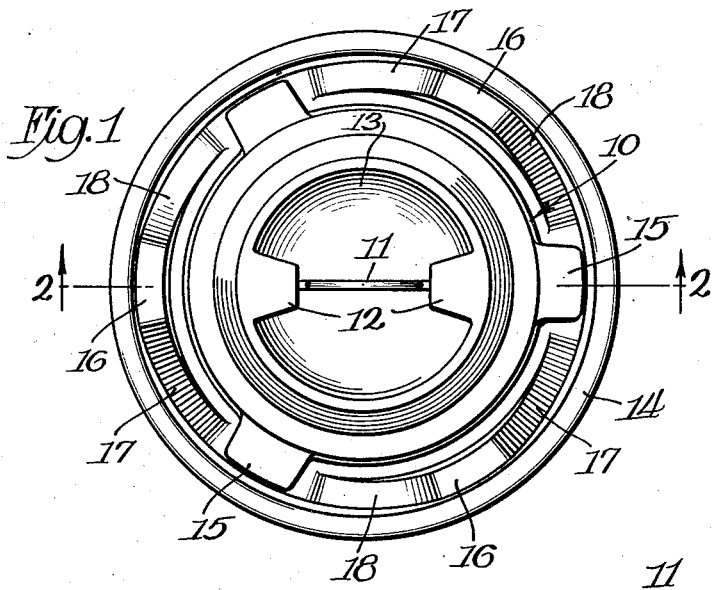
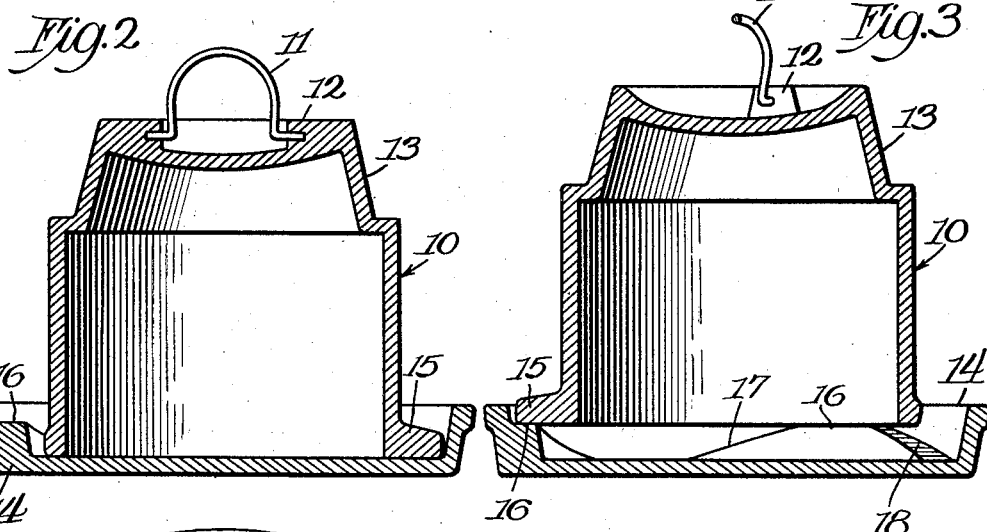
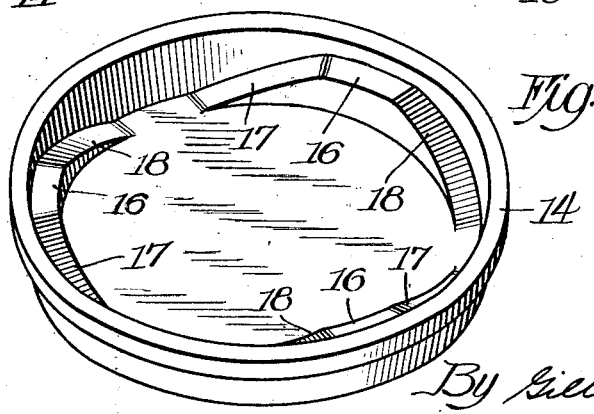
Inventor:
Elmore S. Hoyt
By Gillson, Mann & Cox Attys.

Patented Dec. 2, 1930

1,783,790

UNITED STATES PATENT OFFICE

ELMORE S. HOYT, OF RED WING, MINNESOTA, ASSIGNOR TO RED WING UNION STONE-WARE COMPANY, OF RED WING, MINNESOTA, A CORPORATION OF MINNESOTA

POULTRY FEEDER

Application filed December 6, 1928. Serial No. 324,249.

This invention relates to poultry feeders, and more particularly to the air pressure type of feeder.

The principal object of the invention is the provision of a feeder in which cooperating means are provided on the trough and reservoir for guiding the reservoir to a predetermined elevated position upon rotating the same.

Another object of the invention is the provision of a new and improved poultry feeder that will prevent splashing of the liquid when the same is turned to normal upright position after filling the reservoir.

A further object of the invention is the provision of a feeder that is provided with new and improved means for automatically elevating the reservoir upon rotating the same.

A still further object of the invention is the provision of a feeder that is provided with maximum size openings whereby either liquid, semi-liquid or solid feed may be employed.

Other objects of the invention are the provision of a new and improved feeder that is cheap to manufacture, simple in construction, efficient in operation, composed of a minimum number of parts, of acid-proof material, and that may be readily cleaned and easily kept sanitary.

Other and further objects and advantages of the invention will appear from the following description taken in connection with the accompanying drawings, in which Fig. 1 is a top plan view of the device;

Fig. 2 is a section on line 2—2 of Fig. 1;

Fig. 3 is a vertical section of the device, showing the reservoir in elevated position; and Fig. 4 is a perspective view of the trough.

It is common practice in poultry feeders to employ an inverted reservoir with its lower or open end extending into a trough or saucer, the wall of the reservoir below the upper edge of the trough being perforated or slotted to permit the liquid contents of the reservoir to fill the trough above said slots or perforations. This arrangement is objectionable because on inverting the device after filling the reservoir, the liquid will splash out through the openings in the side wall of the reservoir. Furthermore, the openings are likely to become clogged or stopped up, especially if curded, sour or clabber milk, or a dry grain be used.

It has also been proposed to employ means for supporting the reservoir above the bottom of the trough, the reservoir being lifted onto the supports by hand, but this arrangement is objectionable because in the absence of a guide to determine the height to which the reservoir must be elevated to place it on the supports, the reservoir is often raised too high, with a consequent loss of liquid.

Still other methods have been proposed in this type of feeder in which movable means of one kind or another are provided for closing the feed openings while the device is being inverted. These arrangements are also objectionable because they necessitate the use of more or less complicated mechanism that renders the device impractical because of the nature of the closures and of the added costs in manufacturing the device. Furthermore, these closures are often of metal that chemically reacts more or less with the acid in the sour milk, thereby seriously affecting the same as a feed.

The present invention seeks to remedy these difficulties by the provision of a simple device that may be molded or manufactured from any suitable material, thereby greatly cheapening its manufacture, and that is provided with means for guiding the reservoir to its elevated position by simply rotating the same after it has been inverted, thereby insuring against loss of material in recharging or replenishing the reservoir.

Referring now to the drawings, the reference character 10 designates a jar or reservoir which is preferably though not necessarily of earthenware. This reservoir is adapted to contain feed, water, sour milk or dry feed and the like, as will presently appear. The reservoir is open at its lower end and its upper or closed end is provided with a handle 11. The handle 11 may be of any suitable construction, that shown being in the form of a wire bail pivoted to the lugs 12 on the upper end of the reservoir. If desired, the upper end of the jar or reservoir may be reduced as at 13.

A trough or saucer 14 is provided for receiving the lower end of the reservoir 10 and for containing the material fed into it from the reservoir.

Suitable means are provided for supporting the lower end of the jar or reservoir above the bottom of the trough but below the top thereof. Any appropriate means may be employed for this purpose.

Preferably cooperating elements on the trough and reservoir are provided for performing this function. These elements are so constructed that the reservoir will be elevated and automatically guided to a predetermined height by simply rotating the reservoir when the same rests within the bottom of the trough.

In the form of construction selected to illustrate one embodiment of the invention, the lower portion of the reservoir 10 is provided with a plurality of supporting lugs or arms 15 which are adapted to engage the same number of corresponding cams, supports or supporting members 16. Any suitable number of arms and corresponding supporting members may be employed. As shown, three of each, separated 120° apart about the reservoir and trough are preferably employed, because the supports therefor will offer a minimum obstruction to the free flow of feed from the reservoir into the trough.

Each of the supporting members 16 is preferably though not necessarily integral with both the bottom and side wall of the reservoir. In practice, the trough with the supports 16 therein is molded as a single article. The supports 16 are each provided with a cam or inclined surface at one or both sides. As shown, each support is provided at the sides thereof with the cams or inclined surfaces 17 and 18. The distance between the supports 16 is sufficient to provide proper clearance for the arms 15 when the same are turned to a position to permit the reservoir to rest on the bottom of the trough.

It is desirable that the device be so constructed that it may be used equally as well with semiliquid or solid feed as with liquids, and with as satisfactory results. In order to accomplish this function, it is necessary that provision be made for supporting the reservoir in such a manner as to provide a maximum and unobstructed opening between the reservoir and the trough. As shown, the outside diameter of the reservoir is made less than the inside diameter of the cams or supporting members 16 to provide sufficient clearance to permit the feed to flow into the trough without obstruction. Furthermore, the supports 16, being beveled on both sides, interpose a minimum obstruction to the flow of feed into the trough. The arms 15 are of sufficient length to properly position the reservoir 10 within the trough so that the feed will flow freely into the trough from all sides of the reservoir.

In using the device, the reservoir is removed from the trough and inverted for receiving liquid, semisolid or solid feed. After the receptacle has been filled or partly filled the trough is inverted and placed on the receptacle with the lower edge engaging the trough after which the two are held together and inverted. The receptacle is then given a partial rotation in either direction to cause the arms 15 to ride up the inclines 18 of the supports 16. The incline guides will determine the height to which the reservoir is elevated, thereby eliminating any danger of raising the jar or reservoir so high as to cause the feed to overflow the trough.

While I have shown arms or projections on the reservoir for supporting the same, it is evident that supports of any suitable nature may be employed.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim as my invention:

1. In combination, a receptacle of frangible material open at its lower end, a trough of frangible material for receiving the lower end of said receptacle, supports within said trough integral with the bottom and sides thereof, each of said supports being tapered off at both sides thereof to form an inclined plane leading from the bottom of said trough to the top of the support from each end thereof, and supporting arms integral with and extending radially from the lower portion of said receptacle for engaging said inclined planes for elevating said receptacle when the same is rotated in either direction and for supporting the same in elevated position.

2. In combination, a cylindrical reservoir closed at its upper end and having its lower end open, a trough for receiving said open end, cam members within said trough radially spaced outwardly from the walls of said reservoir, each of said cam members having oppositely extending inclined surfaces, said inclined surfaces being spaced apart at their upper ends to form a reservoir supporting surface, supporting arms extending radially outwardly from said reservoir for engaging said inclined surfaces for elevating said reservoir when the same is rotated in either direction and for engaging said supporting surface for supporting said reservoir in elevated position.

In testimony whereof I affix my signature.

ELMORE S. HOYT.